(12) United States Patent
Hirakawa et al.

(10) Patent No.: US 11,953,892 B2
(45) Date of Patent: Apr. 9, 2024

(54) SELECTION SUPPORT DEVICE, SELECTION SUPPORT METHOD, AND STORAGE MEDIUM

(71) Applicant: HONDA MOTOR CO., LTD., Tokyo (JP)

(72) Inventors: Megumi Hirakawa, Tokyo (JP); Satoshi Murata, Tokyo (JP); Sota Sakaguchi, Tokyo (JP); Shohei Namiki, Tokyo (JP); Ryota Hisada, Tokyo (JP); Ryuichi Kimata, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/830,544

(22) Filed: Jun. 2, 2022

(65) Prior Publication Data

US 2022/0397890 A1 Dec. 15, 2022

(30) Foreign Application Priority Data

Jun. 11, 2021 (JP) ................................ 2021-098130

(51) Int. Cl.
*G05B 19/418* (2006.01)
*G05B 19/4065* (2006.01)

(52) U.S. Cl.
CPC ..... *G05B 19/4187* (2013.01); *G05B 19/4065* (2013.01); *G05B 19/4183* (2013.01); *G05B 2219/31325* (2013.01); *G05B 2219/45106* (2013.01)

(58) Field of Classification Search
CPC ............ G05B 19/4187; G05B 19/4065; G05B 19/4183; G05B 2219/31325; G05B 2219/45106; G07C 5/0841; G07C 2205/02; G07C 5/008; G06Q 10/0631; G06Q 10/20; G06Q 50/02
See application file for complete search history.

(56) References Cited

U.S. PATENT DOCUMENTS

2004/0260470 A1* 12/2004 Rast .................... G06Q 10/0637
705/337
2019/0265749 A1* 8/2019 Asada ................. G06F 13/4027

FOREIGN PATENT DOCUMENTS

JP 2020-195316 A 12/2020

* cited by examiner

*Primary Examiner* — Tejal Gami
(74) *Attorney, Agent, or Firm* — Thomas| Horstemeyer, LLP

(57) ABSTRACT

A selection support device that supports selection of a work machine to be used for work from among a plurality of work machines, the selection support device including: a history information acquisition unit configured to acquire history information on a use history of each work machine; a specifying unit configured to specify a degree of use of each work machine based on the history information; and a selection unit configured to preferentially select a work machine with a small degree of use as a work machine to be used for work.

10 Claims, 15 Drawing Sheets

FIG. 3A

| TYPE | ID | DEGREE OF USE | FREQUENCY | OTHERS |
|---|---|---|---|---|
| RIDING LAWN MOWER | A01 | 100 | 0.5 hours / day | ... |
| RIDING LAWN MOWER | A02 | 130 | ... | ... |
| RIDING LAWN MOWER | A03 | 90 | ... | ... |
| WALKING LAWN MOWER | B01 | 40 | ... | ... |
| WALKING LAWN MOWER | B02 | 70 | ... | ... |
| ... | ... | ... | ... | ... |
| BRUSHCUTTER | C01 | 250 | ... | ... |
| BRUSHCUTTER | C02 | 190 | ... | ... |
| ... | ... | ... | ... | ... |
| BLOWER | D01 | 320 | ... | ... |
| BLOWER | D02 | 390 | ... | ... |
| ... | ... | ... | ... | ... |

FIG. 3B

| TYPE | MAINTENANCE | REPLACEMENT |
|---|---|---|
| RIDING LAWN MOWER | ○○ HOUR | ×× HOUR |
| WALKING LAWN MOWER | △△ HOUR | □□ HOUR |
| BRUSHCUTTER | ○△ HOUR | ×□ HOUR |
| BLOWER | ○× HOUR | ×○ HOUR |

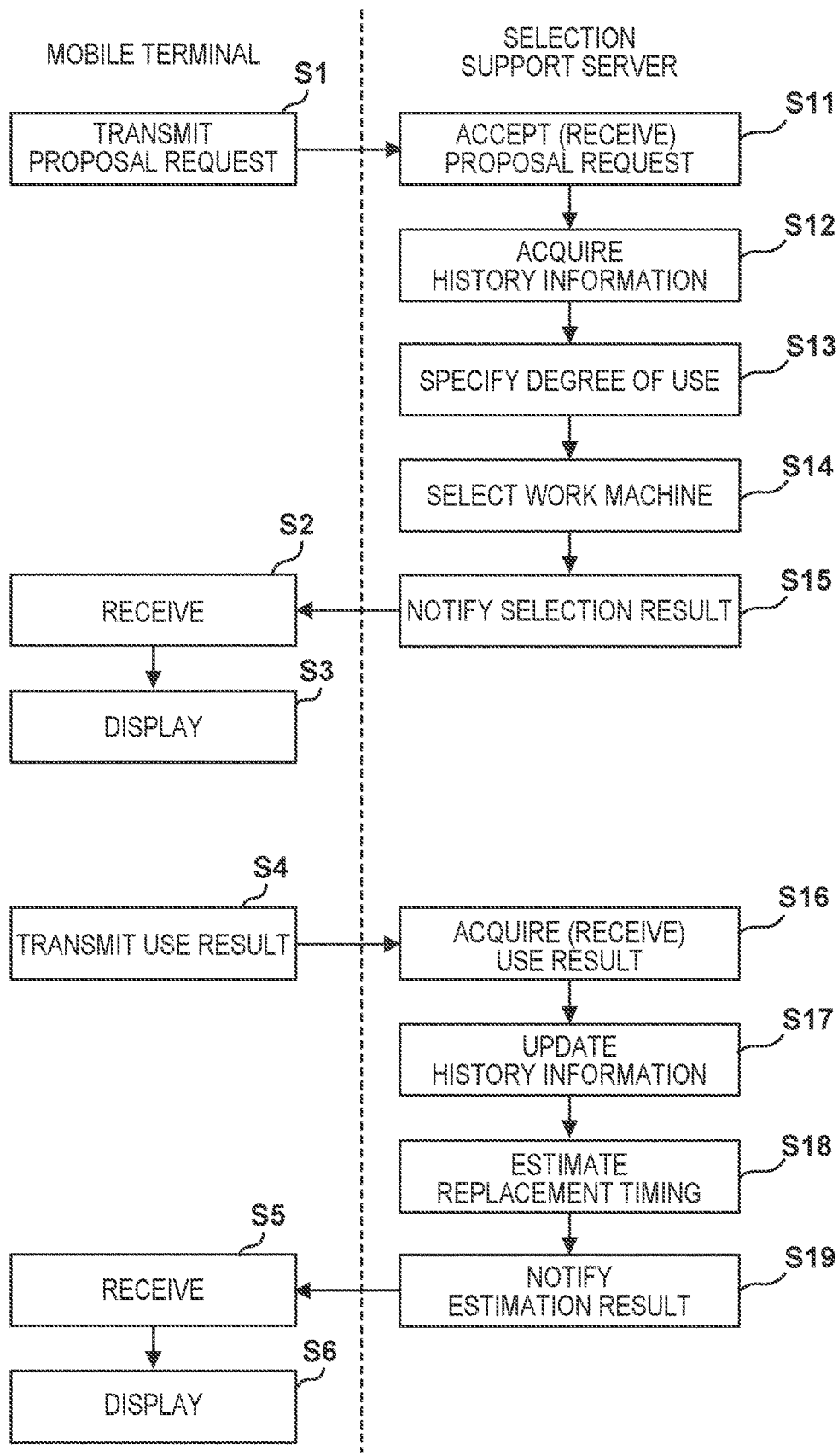

FIG. 5A

| TYPE | NUMBER |
|---|---|
| RIDING LAWN MOWER | 1 |
| WALKING LAWN MOWER | 2 |
| BRUSHCUTTER | 1 |
| BLOWER | 2 |

FIG. 5B

RECOMMENDED WORK MACHINE

RIDING LAWN MOWER: A03
WALKING LAWN MOWER: B01, B05
BRUSHCUTTER: C04
BLOWER: D05, D06

FIG. 5C

RECOMMENDED MAINTENANCE TIMING

RIDING LAWN MOWER: AROUND SEPTEMBER
WALKING LAWN MOWER: AROUND JULY
BRUSHCUTTER: AROUND AUGUST
BLOWER: AROUND NOVEMBER

REPLACEMENT TIMING

RIDING LAWN MOWER: AROUND MARCH ○○
WALKING LAWN MOWER: AROUND FEBRUARY ○✕
BRUSHCUTTER: AROUND APRIL △○
BLOWER: AROUND OCTOBER ✕✕

[INDIVIDUAL CHECK]

FIG. 6A

| STATE OF WORK FIELD | WEIGHTING |
|---|---|
| ROUGH LAND | 1.2 |
| NORMAL | 1.0 |
| GOOD LAND | 0.9 |

FIG. 6B

| WORKER | WEIGHTING |
|---|---|
| ROUGH | 1.3 |
| NORMAL | 1.1 |
| CAREFUL | 1.0 |

FIG. 8A
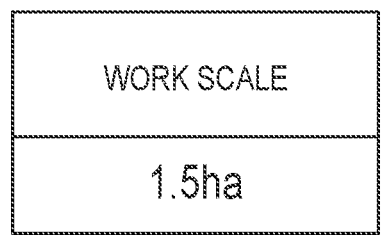
| TYPE | PATTERN 1 | PATTERN 2 |
| --- | --- | --- |
|  | ABOUT 2 HOURS | ABOUT 3.5 HOURS |
| RIDING LAWN MOWER | A01,A02 | A01 |
| WALKING LAWN MOWER | B02,B03 | B02,B03 |
| BRUSHCUTTER | ... | ... |
| BLOWER | ... | ... |

FIG. 8B

| RIDING LAWN MOWER | 1~2 | 2~4 | 3~6 |
| WALKING LAWN MOWER | 2~4 | 3~5 | 4~8 |
| BRUSHCUTTER | 1~3 | 2~5 | 4~6 |
| BLOWER | 2~4 | 3~7 | 5~9 |

SMALL ──────────────── ▶ LARGE
WORK SCALE

FIG. 8C

| TYPE | CAPABILITY |
| --- | --- |
| RIDING LAWN MOWER | ○○ ha/hour |
| WALKING LAWN MOWER | △△ ha/hour |
| BRUSHCUTTER | ○△ ha/hour |
| BLOWER | ○✕ ha/hour |

| TYPE | NUMBER | |
| --- | --- | --- |
| | R1 | R2 |
| RIDING LAWN MOWER | 2 | 1 |
| WALKING LAWN MOWER | 2 | 1 |
| BRUSHCUTTER | ... | ... |
| BLOWER | ... | ... |

| AREA | WORK INFORMATION |
| --- | --- |
| R1 | 5 HOURS |
| R2 | 2 HOURS |

| TYPE | R1 | R2 |
| --- | --- | --- |
| RIDING LAWN MOWER | A02,A03 | A01 |
| WALKING LAWN MOWER | B02,B03 | B01 |
| BRUSHCUTTER | ... | ... |
| BLOWER | ... | ... |

SELECTION SUPPORT DEVICE, SELECTION SUPPORT METHOD, AND STORAGE MEDIUM

CROSS-REFERENCE TO RELATED APPLICATION(S)

This application claims priority to and the benefit of Japanese Patent Application No. 2021-098130 filed on Jun. 11, 2021, the entire disclosure of which is incorporated herein by reference.

BACKGROUND OF THE INVENTION

Field of the Invention

The present invention relates to a technique for supporting selection of a work machine to be used for work.

Description of the Related Art

Work machines such as a lawn mower, a snow blower, an agricultural work machine, and a blower deteriorate due to use, and maintenance and replacement are required. As one of guides for the timing of maintenance and replacement, the use time (working time) of the work machine is known. Japanese Patent Laid-Open No. 2020-195316 discloses a technique for measuring a working time of a work machine.

A landscaper that performs work in a wide range of work fields selects and uses a work machine to be used for the day from among a large number of work machines. When the selection of the work machine is biased, the maintenance or replacement timing of the work machine varies, which causes a burden of management.

SUMMARY OF THE INVENTION

It is therefore an object of the present invention to provide a technique for supporting leveling of use of work machines.

According to an aspect of the present invention, there is provided a selection support device that supports selection of a work machine to be used for work from among a plurality of work machines, the selection support device comprising: a history information acquisition unit configured to acquire history information on a use history of each work machine; a specifying unit configured to specify a degree of use of each work machine based on the history information; and a selection unit configured to preferentially select a work machine with a small degree of use as a work machine to be used for work.

Further features of the present invention will become apparent from the following description of exemplary embodiments (with reference to the attached drawings).

BRIEF DESCRIPTION OF THE DRAWINGS

FIG. 3A is a diagram illustrating an example of history information;
FIG. 3B is a diagram illustrating an example of work machine information;
FIG. 4 is a flowchart illustrating a processing example of the system;
FIG. 5A is a diagram illustrating an example of number-of-work machines instruction information included in a proposal request;
FIG. 5B is a diagram illustrating a display example of a selection result;
FIG. 5C is a diagram illustrating a display example of estimation results of a maintenance timing and a replacement timing;
FIG. 6A is a diagram illustrating an example of weighting;
FIG. 6B is a diagram illustrating an example of weighting;
FIG. 8A is a diagram illustrating an example of a plurality of selection patterns in accordance with work information;
FIG. 8B is a diagram illustrating an example of selecting a number of work machines in accordance with a work scale;
FIG. 8C is a diagram illustrating an example of the work machine information.

DESCRIPTION OF THE EMBODIMENTS

Figure 1:
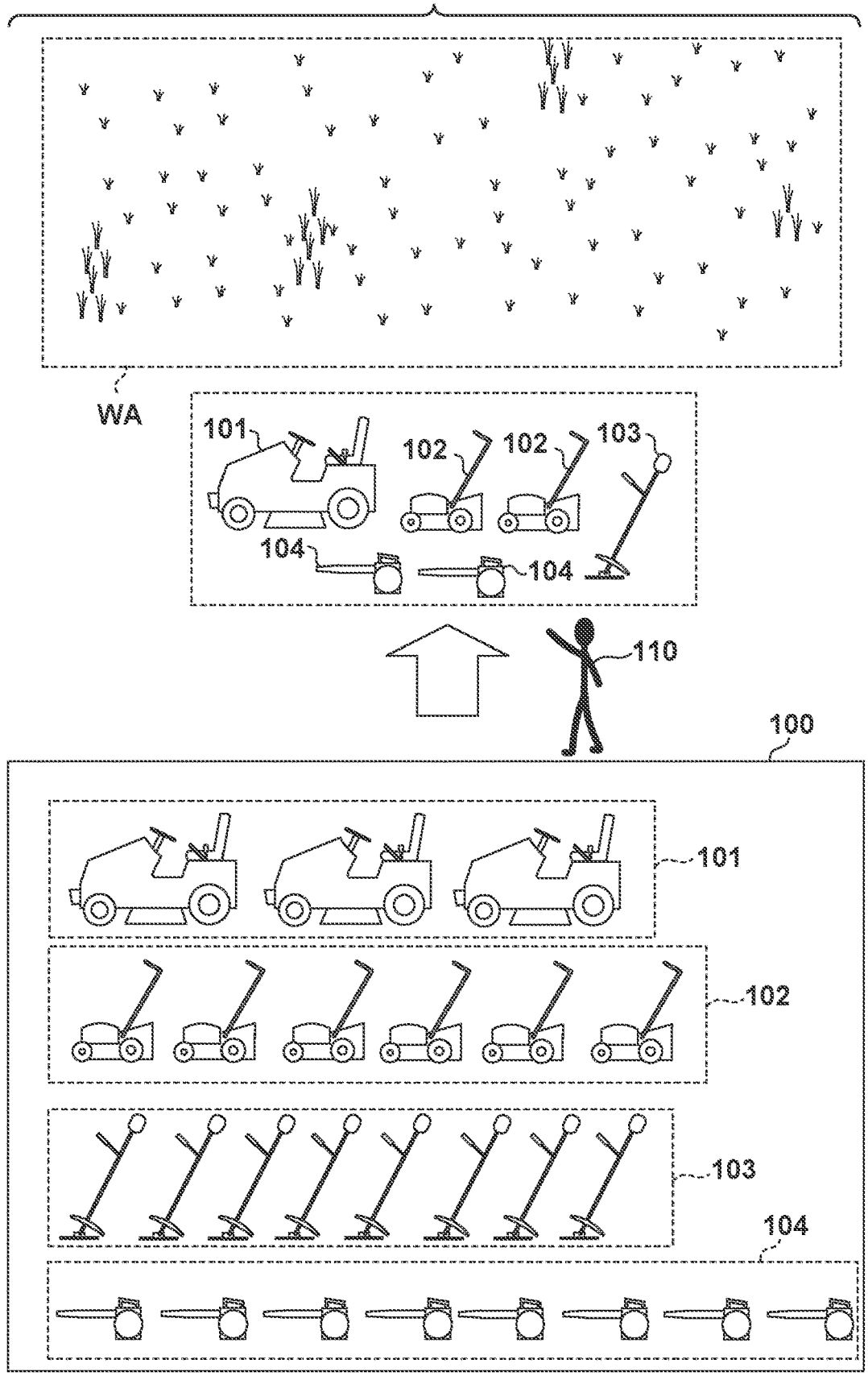
FIG. 1 is an explanatory diagram illustrating an example of selection support.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is an explanatory diagram illustrating an example of selection support according to the present invention. In the illustrated example, a case where the lawn mowing work is performed on a work field WA is assumed. A supervisor 110 of the contractor who performs the lawn mowing work selects a work machine to be used in work on the work field WA from among work machines 101 to 104 stored and managed in a base (warehouse) 100 by the contractor. The selected work machine is transported to the work field WA using a truck and the like and used for work.

In the present embodiment, four types of work machines are assumed as work machines that can be used for work. The work machine 101 is a riding lawn mower, and the work machine 102 is a walking lawn mower. The work machine 103 is a brushcutter, and the work machine 104 is a blower. In the example of FIG. 1, the supervisor 110 selects one work machine 101, two work machines 102, one work machine 103, and two work machines 104 as the work machines to be used for the work field WA.

The plurality of work machines 101 to 104 is stored in the base 100. Depending on the scale of the contractor, the number of work machines to be managed is large. It is easier to manage the work machines 101 to 104 when the maintenance timing and the replacement timing (timing for buying a replacement) coincide for each type. For example, in a case where 20 work machines 102 (walking lawn mowers) are managed, it is possible to reduce a burden of office processing associated with replacement by collectively replacing all the 20 work machines. However, the use frequencies of the work machines do not necessarily coincide with each other. Therefore, the maintenance timing and the replacement timing are different for each work machine, and it is difficult to perform collective processing.

Therefore, in the present embodiment, leveling of use of work machines is supported for each type of work machines. Accordingly, the maintenance timing and the replacement timing of the same type of work machine can be made uniform.

Configuration Example of System

Figure 2:
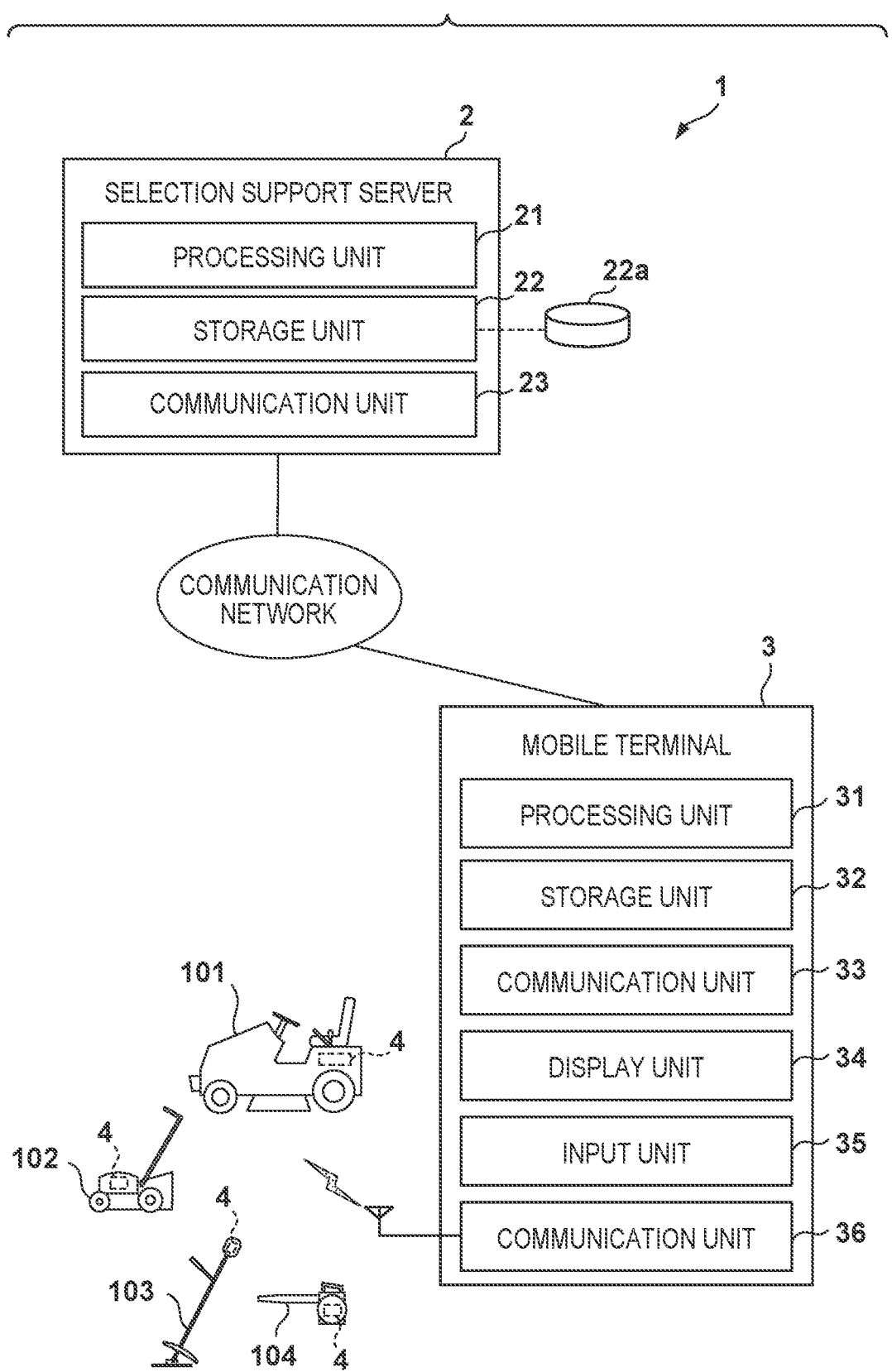
FIG. 2 is a block diagram of a selection support system.

FIG. 2 is a block diagram of a selection support system 1. The system 1 includes a selection support server 2 that is a server computer and a mobile terminal 3 that is a portable computer. In the system 1, the selection support server 2 is a selection support device that supports selection of a work machine to be used for work. The selection support server 2 includes a processing unit 21, a storage unit 22, and a communication unit 23. The processing unit 21 is a processor represented by a CPU, and executes a program stored in the storage unit 22. The storage unit 22 is a storage device such as a semiconductor memory (RAM, ROM, etc.) or a hard disk. The program stored in the storage unit 22 may be distributed in a storage medium such as a CD-ROM and installed in the selection support server 2. The communication unit 23 includes a wired or wireless communication interface capable of communicating with the mobile terminal 3 via a communication network.

The storage unit 22 stores various types of data in addition to a program executed by the processing unit 21. The storage unit 22 includes a database 22a as various data. An example of the information accumulated in the database 22a will be described later.

The mobile terminal 3 is a communication terminal such as a smartphone used by the supervisor 110. The mobile terminal 3 includes a processing unit 31, a storage unit 32, a communication unit 33, a display unit 34, an input unit 35, and a communication unit 36. The processing unit 31 is a processor represented by a CPU, and executes a program stored in the storage unit 32. The storage unit 32 is a storage device such as a semiconductor memory (RAM, ROM, etc.). The storage unit 32 stores an application program that receives the selection support service in the present embodiment. This application program may be downloaded from the selection support server 2, or may be distributed in a storage medium such as a CD-ROM and installed in the mobile terminal 3.

The communication unit 33 includes a wireless communication device capable of communicating with the selection support server 2 via a communication network. The display unit 34 is an electronic image display device, and is, for example, a liquid crystal display device. The input unit 35 is a device that accepts an input of a user (supervisor 110). The display unit 34 and the input unit 35 constitute a touch panel display in the present embodiment.

The communication unit 36 includes a near field wireless communication device capable of performing near field wireless communication with a measuring instrument 4. The measuring instrument 4 is provided in each of the work machines 101 to 104, and automatically measures the working time of the work machine. The communication unit 36 can acquire information on the working time from the measuring instrument 4 by wireless communication after the working of the work machines 101 to 104.

The measuring instrument 4 includes a communication circuit that transmits the working time to the communication unit 36 in response to a request from the communication unit 36. An identifier ("ID" to be described later) for specifying each work machine is set in each work machine, and the communication circuit transmits the working time together with this identifier. The measuring instrument 4 may be a measuring instrument using a known measurement principle. For example, the measuring instrument 4 may include a sensor that detects vibration, and measure a time during which vibration is detected as a working time. In addition, the measuring instrument 4 may include a sensor that detects a current supplied to a motor included in the work machine, and measure a time during which the current is detected as a working time. In addition, the measuring instrument 4 may include a sensor that detects whether a main power supply included in the work machine is ON or OFF, and may measure a time when the main power supply is ON as a working time.

Example of Information Accumulated in Database

FIGS. 3A and 3B illustrate an example of information accumulated in the database 22a, FIG. 3A illustrates an example of history information, and FIG. 3B illustrates an example of work machine information. The supervisor 110 registers the history information and the basic information of the work machine information using the mobile terminal 3. However, the administrator of the selection support server 2 may perform registration by hearing from the supervisor 110 and the like.

The history information is information on a use history of each of the work machines 101 to 104. The "ID" is an identifier for individually specifying each of the work machines 101 to 104. The alphabetical character in the beginning of the ID represents the type of the work machine, and "A" is a riding lawn mower, "B" is a walking lawn mower, "C" is a brushcutter, and "D" is a blower.

The "degree of use" is information indicating the degree to which the work machine has been used so far. In the present embodiment, the "degree of use" is the cumulative working time so far, and for example, the cumulative working time of the riding lawn mower with "ID" of A01 is 100 hours. The "frequency" indicates a working time per unit period from the start of use of the work machine until now. In the present embodiment, the "frequency" is the working time per day, and its computing equation is the cumulative working time/the number of days from the start of use of the work machine. Various types of information are accumulated in "others". For example, a use start date of the work machine, a degree of use at the previous maintenance, information on whether or not the work machine is currently selected as the work machine to be used for work, and the like are accumulated.

The work machine information is information serving as a guide for the maintenance timing and the replacement timing for each type of work machine. In the example of FIG. 3B, the maintenance timing and the replacement timing are specified by the working time. For example, the maintenance timing is defined as a maintenance cycle time, and in a case where this is specified as 50 hours, maintenance such as replacement of a consumable part is recommended every 50 hours. In a case where the replacement time is specified as 500 hours in the cumulative working time as the replacement timing, when the cumulative working time reaches 500 hours, the replacement is recommended.

Processing Example

FIG. 4 is a flowchart illustrating a processing example of the system 1, and illustrates a processing example executed by the processing unit 21 of the selection support server 2 and the processing unit 31 of the mobile terminal 3. The supervisor 110 activates the application program of the mobile terminal 3 and transmits a proposal request related to selection of a work machine to be used for work from the mobile terminal 3 to the selection support server 2 (S1). The proposal request includes information on the type and number of work machines necessary for work. FIG. 5A illustrates one such example. In the illustrated example, as the number of the work machine 101 (riding lawn mower), the work machine 102 (walking lawn mower), the work machine 103 (brushcutter), and the work machine 104 (blower), one unit, two units, one unit, and two units are required in order. The supervisor 110 selects the type and the number of necessary work machines in accordance with the scale of the work field WA, and designates the type and the number in the proposal request.

The selection support server 2 receives and accepts the proposal request from the mobile terminal 3 (S11), and acquires information on the type and number of work machines necessary for work. In S12, the selection support server 2 acquires history information from the database 22a. In S13, the selection support server 2 refers to the history information to specify the degree of use of each work machine of the type related to the current proposal request. In S14, the selection support server 2 compares the degree of use of each work machine specified in S13 for each type of work machine, and selects a recommended work machine for each type of work machine. In the case of the present embodiment, a work machine with a small degree of use is preferentially selected as a work machine to be used for work.

As a specific selection method, for example, the work machine with the smallest degree of use is selected in order. For example, in the history information of FIG. 3A, when one riding lawn mower is selected, the riding lawn mower with "ID" of A03 is selected. In addition, in the history information of FIG. 3A, when two riding lawn mowers are selected, the riding lawn mower with the "ID" of A03 is selected, and then the riding lawn mower with the "ID" of A01 is selected.

As another specific selection method, for example, the work machine is arbitrarily selected from work machines that fall below the average value of the degree of use. For example, in the history information of FIG. 3A, an average value of the degrees of use of the riding lawn mower is an average value=(100+130+90)/3≈107. When one riding lawn mower is selected, the riding lawn mower with the "ID" of A03 or the riding lawn mower with the "ID" of A01 is selected. In this case, which one of A03 and A01 is selected may be a lottery.

In S15, the selection support server 2 notifies the mobile terminal 3 of the selection result in S14. The notification here is performed, for example, by transmitting information indicating the ID of the selected work machine to the mobile terminal 3.

In S2, the mobile terminal 3 receives the notification from the selection support server 2, and in S3, displays the selection result of the selection support server 2 on the display unit 34. FIG. 5B is a diagram illustrating a display example of the display unit 34. In the illustrated example, an ID of a work machine recommended to be used is illustrated for each type of work machine. The supervisor 110 can obtain a selection reference of the work machine to be used for work by this display. If the supervisor 110 selects the work machine to be used for work according to the selection result of the selection support server 2, the use of the same type of work machines can be leveled. Therefore, the selection support server 2 can support leveling of use of work machines.

Next, an example of processing of the system 1 after completion of work will be described. When the work in the work field WA is completed, the work machine used for the work returns to the base 100. The supervisor 110 collects information on the working time of the work machine used for the work. Specifically, by wireless communication between the mobile terminal 3 and the measuring instrument 4 of each work machine used for work, the supervisor 110 takes in the ID of the work machine and the information on the working time measured by the measuring instrument 4 into the mobile terminal 3, and instructs the mobile terminal 3 to transmit the information to the selection support server 2.

Referring to FIG. 4, in S4, the mobile terminal 3 transmits the use result to the selection support server 2. The use result includes the ID of each work machine used for work and information on the working time measured by the measuring instrument 4. In S16, the selection support server 2 acquires (receives) the use result from the mobile terminal 3. In S17, the selection support server 2 updates the history information in the database 22a based on the use result acquired in S16. In this update, the working time is added to the degree of use for the work machine with the ID indicated in the use result. For example, in the example of FIG. 3A, when the riding lawn mower with the "ID" of A03 is used for 5 hours, the "degree of use" is updated from 90 to 95. The "frequency" of all the work machines is also updated.

In S18, the selection support server 2 estimates the maintenance timing and the replacement timing for each work machine and each type of work machine based on the updated history information and the work machine information (FIG. 3B). The maintenance timing and the replacement timing for each work machine are estimated by, for example, the following computing equation.

Maintenance timing={maintenance cycle time−(degree of use−degree of use at previous maintenance)}÷frequency Replacement timing=(replacement time−degree of use)÷frequency The maintenance timing and the replacement timing for each type of work machine are average values of the maintenance timing and the replacement timing for each type of work machine.

In S19, the selection support server 2 notifies the mobile terminal 3 of the estimation result in S18. The notification here is performed, for example, by transmitting information indicating the maintenance timing and the replacement timing to the mobile terminal 3.

In S5, the mobile terminal 3 receives the notification from the selection support server 2, and in S6, displays the estimation result of the selection support server 2 on the display unit 34. FIG. 5C is a diagram illustrating a display example of the display unit 34. In the illustrated example, the next maintenance timing and the replacement timing, which are the estimation results of the selection support server 2, are illustrated for each type of work machine. With this display, the supervisor 110 can obtain a reference serving as a guide for the maintenance timing or replacement timing of the work machine, and can utilize the reference for the future operation of the work machine.

When the supervisor 110 selects the "individual check" button during the display, the mobile terminal 3 requests the selection support server 2 for an individual maintenance timing and replacement timing for each work machine, and by return, the selection support server 2 transmits the individual maintenance timing and replacement timing for each work machine to the mobile terminal 3. The mobile terminal 3 displays the received information on the display unit 34. Accordingly, the supervisor 110 can also obtain a reference serving as a guide for the individual maintenance timing and replacement timing of the work machine.

Second Embodiment

Even in the same working time, the degree of wear or the degree of deterioration of the work machine varies depending on the working environment. In the first embodiment, the cumulative working time is exemplified as the "degree of use", but different indexes may be used. However, since the cumulative working time is a main guide for the maintenance timing or the replacement timing, it is preferable that the cumulative working time is an index that increases as the cumulative working time increases. In the present embodiment, the "degree of use" is computed by weighting the working time. The degree of use is computed by the value of the degree of use=working time×weighting.

FIG. 6A is a diagram illustrating an example of weighting. In the illustrated example, the weighting value varies depending on the state of the work field. When the state of the work field is normal, the weighting is set to 1.0 (no increase or decrease). In a rough work field, the work machine wears and deteriorates even in the same working time. Therefore, when the state of the work field is rough, the weighting is set to 1.2 (increase). Examples of the rough land include a work field where turf maintenance has been rarely performed, a work field with many undulations, and a work field with many obstacles (rocks and artifacts). When the state of the work field is good, the weighting is set to 0.9 (decrease). Examples of the good land include a work field where turf maintenance is periodically performed and a flat work field.

In weighting, the type of the state of the work field may be selected by the supervisor 110. For example, when the use result in S4 in FIG. 4 is transmitted, the supervisor 110 may designate the type of the current state of the work field. When updating the history information in S17, the selection support server 2 updates the degree of use after update=degree of use before update+working time×weighting value. The type of the state of the work field may be selected by the selection support server 2. In this case, the relationship between the image of the work field and the degree of wear or the degree of deterioration of the work machine that has worked on the work field is learned by the artificial intelligence (machine learning), and the learning result is stored in the database 22a to be usable. Then, the type of the state of the work field may be discriminated using the learning result from the current image of the work field provided by the supervisor 110.

FIG. 6B is a diagram illustrating another example of weighting. In the illustrated example, the weighting value varies depending on the work attitude of the worker (or the group of workers) who has performed the work. In a case where a worker who performs careful work takes charge of the work, it is estimated that the work machine wears and deteriorates according to the working time. Therefore, the weighting is set to 1.0 (no increase or decrease). In a case where a worker whose work is not rough but is not careful takes charge of the work, the weighting is set to 1.1 (slightly increased). In a case where a worker who performs rough work takes charge of the work, the work machine wears and deteriorates even in the same working time. Therefore, the weighting is set to 1.3 (increase).

Also in the weighting of the example of FIG. 6B, the type of work attitude may be selected by the supervisor 110. For example, when the use result in S4 in FIG. 4 is transmitted, the supervisor 110 may designate the type of attitude of the worker who has performed the current work. When updating the history information in S17, the selection support server 2 updates the degree of use after update=degree of use before update+working time×weighting value.

Third Embodiment

In the first embodiment, when the work machine is selected in S14, the work machine with a small degree of use is preferentially selected as the work machine to be used for work. However, when there is a large difference in the degree of use between the work machines and it is difficult to perform leveling before replacement, it may be advantageous to first use out the work machine with a large degree of use. For example, in a case where two of the three riding lawn mowers in FIG. 3A have a degree of use of around 80, the remaining one has a degree of use of around 400, and the replacement time is 500 hours, it is advantageous to use out the riding lawn mower with a degree of use of around 400 and replace it with a new riding lawn mower.

Figure 7A:
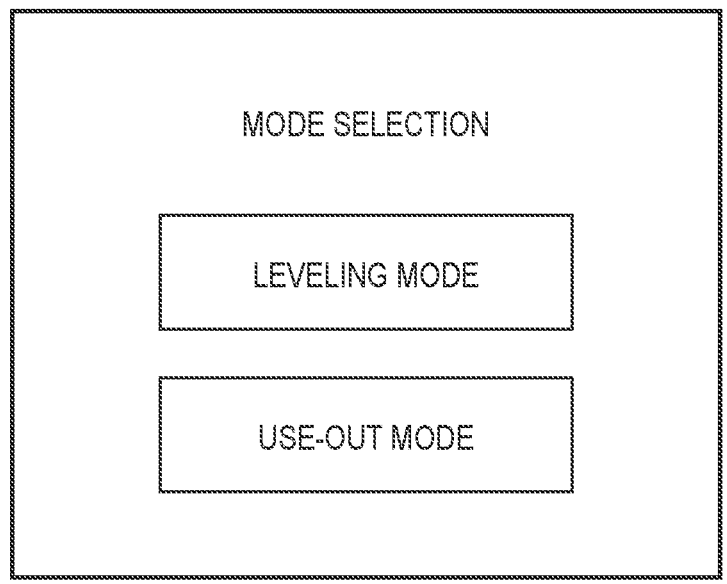
FIG. 7A is a diagram illustrating an example of a mode selection screen.

Therefore, the supervisor 110 may be allowed to select the selection criteria of the recommended work machine. FIG. 7A is a display example of a mode selection screen on the display unit 34 of the mobile terminal 3. In the illustrated example, a "leveling mode" button and a "use-out mode" button are displayed. The leveling mode is a mode for preferentially selecting a work machine with a small degree of use as the work machine to be used for work described in the first embodiment. Conversely, the use-out mode is a mode for preferentially selecting a work machine with a large degree of use as a work machine to be used for work.

Figure 7B:
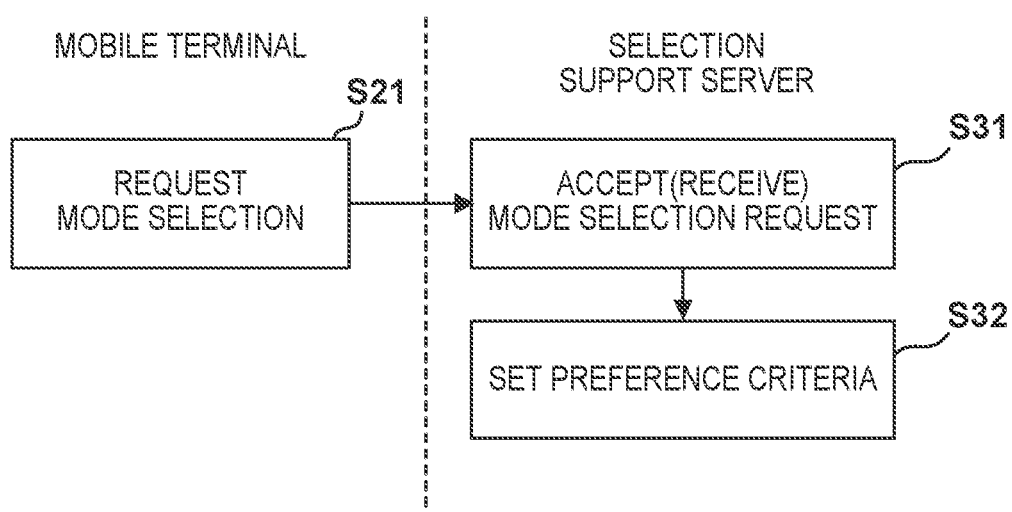
FIG. 7B is a flowchart illustrating a processing example of the system.

FIG. 7B is a flowchart illustrating a processing example of the system 1 related to mode selection. When the supervisor 110 performs selection operation on any button on the mode selection screen of FIG. 7A, a mode selection request for requesting processing in the mode selected by the supervisor 110 is transmitted from the mobile terminal 3 to the selection support server 2 in S21. The selection support server 2 receives and accepts the mode selection request from the mobile terminal 3 (S31), and sets the selection criteria of the mode (leveling mode or use-out mode) requested by the mode selection request as the selection criteria of the recommended work machine in S32.

When the leveling mode is set, the work machine with a small degree of use is preferentially selected when the recommended work machine is selected in S14 in FIG. 4, and when the use-out mode is set, the work machine with a large degree of use is preferentially selected when the recommended work machine is selected in S14 in FIG. 4.

Fourth Embodiment

Figure 9:
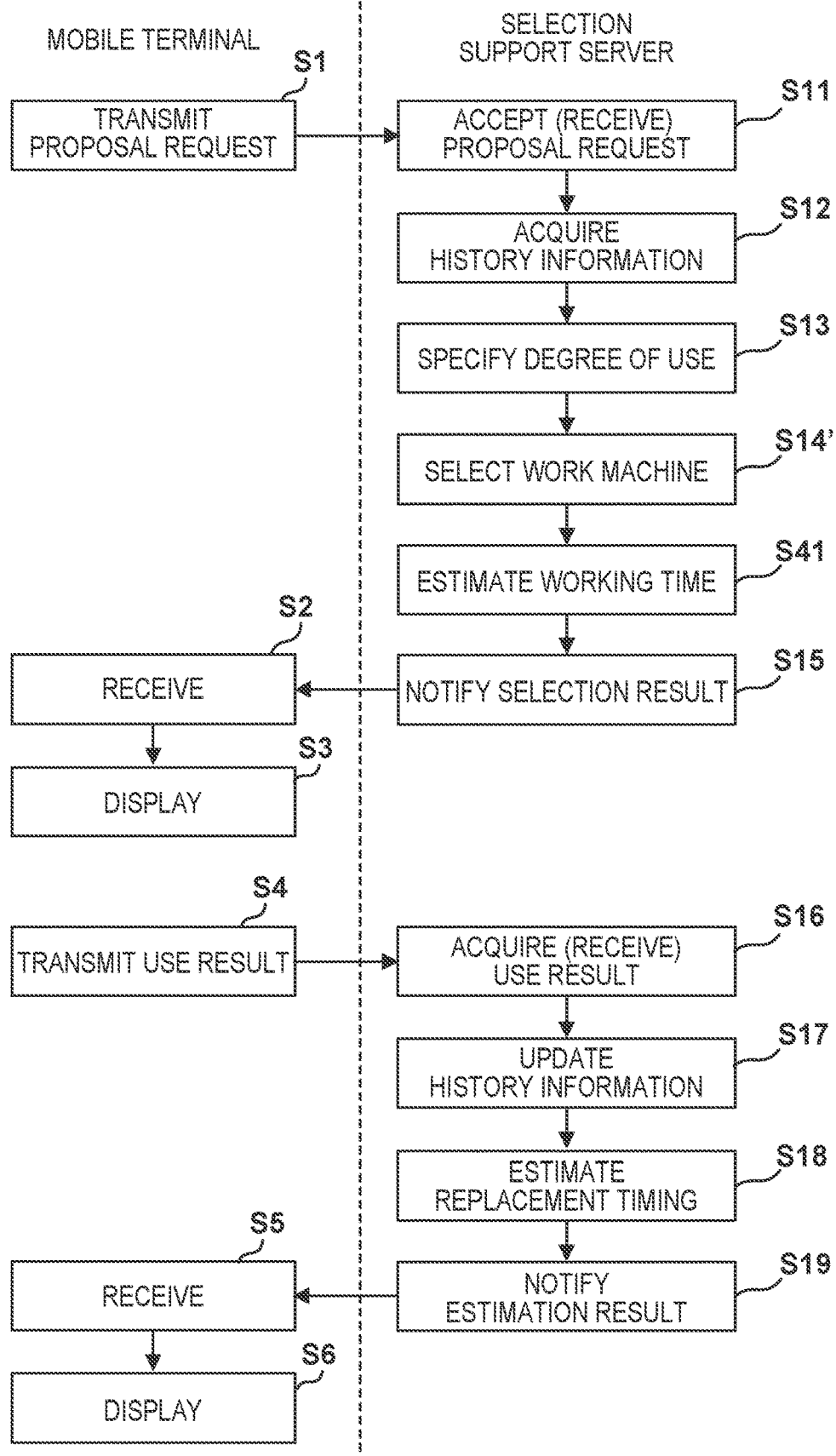
FIG. 9 is a flowchart illustrating another processing example of the system.

In the first embodiment, in the proposal request of S1, the supervisor 110 designates the type and the number of necessary work machines. However, in the proposal request in S1, the supervisor 110 may designate the work information and select the type and the number of necessary work machines on the side of the selection support server 2. FIG. 8A is an explanatory diagram illustrating one such example. FIG. 9 is a flowchart illustrating a processing example of the system 1 in the present embodiment instead of the example of FIG. 4, and processing different from that in FIG. 4 will be described.

In the example of FIG. 8A, the work scale is designated as the work information. The work scale here is the work area (1.5 ha) of the work field WA. The supervisor 110 designates the work scale when making the proposal request in S1. When accepting the proposal request in S11, the selection support server 2 acquires work information (work scale). When selecting the recommended work machine in S14', the selection support server 2 first selects the type and number of work machines to be used for work. This selection can be selected according to a predetermined rule as exemplified in FIG. 8B, for example. In the illustrated example, the size of the work scale and the number of work machines for each type of work machine suitable at that time are illustrated. Such rules are created in accordance with past work results and stored in the database 22a.

Artificial intelligence (machine learning) may be used to select the type and number of work machines to be used for work. In this case, the relationship between the work scale of the work field and the type and number of the work machines that have worked on the work field is learned by the artificial intelligence, and the learning result is stored in the database 22a to be usable. Then, the type and number of work machines may be selected using the learning result from the information on the current work scale provided by the supervisor 110.

After the type and number of work machines are selected by such a method, the degree of use of each work machine is compared, and the recommended work machine is selected for each type of work machine from the viewpoint of the degree of use.

In the example of FIG. 8A, two patterns of pattern 1 and pattern 2 are selected as selection examples of the recommended work machine. Each pattern indicates an ID of the recommended work machine for each type of the use machine. In pattern 1, there are two riding lawn mowers and two walking lawn mowers. On the other hand, in pattern 2, there are two walking lawn mowers, but there is one riding lawn mower.

In the case of the present embodiment, the selection support server 2 estimates the working time for each pattern in S41. In the example of FIG. 8A, the estimated working time for each pattern is also illustrated. In the case of pattern 1, the estimated working time is about 2 hours, and in the case of pattern 2, the estimated working time is about 3 hours and 30 minutes.

The working time can be estimated by storing information indicating the capability of the work machine in the database 22a in advance and computing the working time with reference to the information. The information indicating the capability of the work machine can be a part of the work machine information (FIG. 3B). FIG. 8C is a diagram illustrating an example of information indicating the capability of the work machine. In the illustrated example, the workable area of the work machine per unit time is specified for each type of work machine. The estimated working time of each pattern in FIG. 8A can be computed from the type and number of the selected work machines and the information in FIG. 8C.

In the present embodiment, information of the pattern 1 and the pattern 2 illustrated in FIG. 8A is sent to the mobile terminal 3 as a selection result of S15. The supervisor 110 can compare and examine the pattern 1 and the pattern 2 and select a work machine to be used for work. For example, in the case of pattern 1, there is an advantage that the working time is short. In addition, in the case of pattern 2, there is an advantage that the number of riding lawn mowers is small.

In the present embodiment, two types of patterns are exemplified as selection examples of the recommended work machine, but three or more types of patterns may be generated, or conversely, only one type of pattern may be generated and the working time may be estimated.

Fifth Embodiment

Figure 10A:
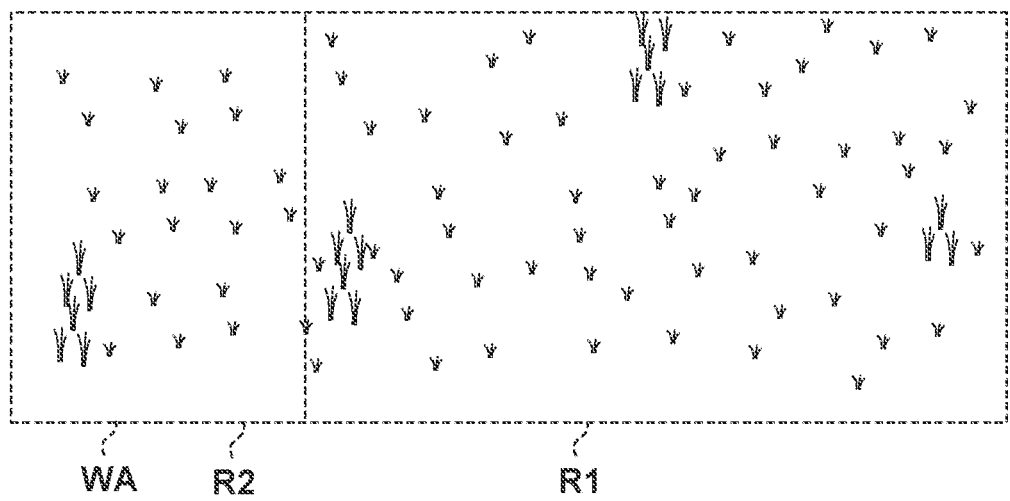
FIG. 10A is a diagram illustrating an example of a work area.
Figure 10B:
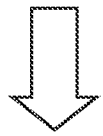
FIG. 10B is a diagram illustrating an example of the plurality of selection patterns in accordance with the work information.
Figure 11:
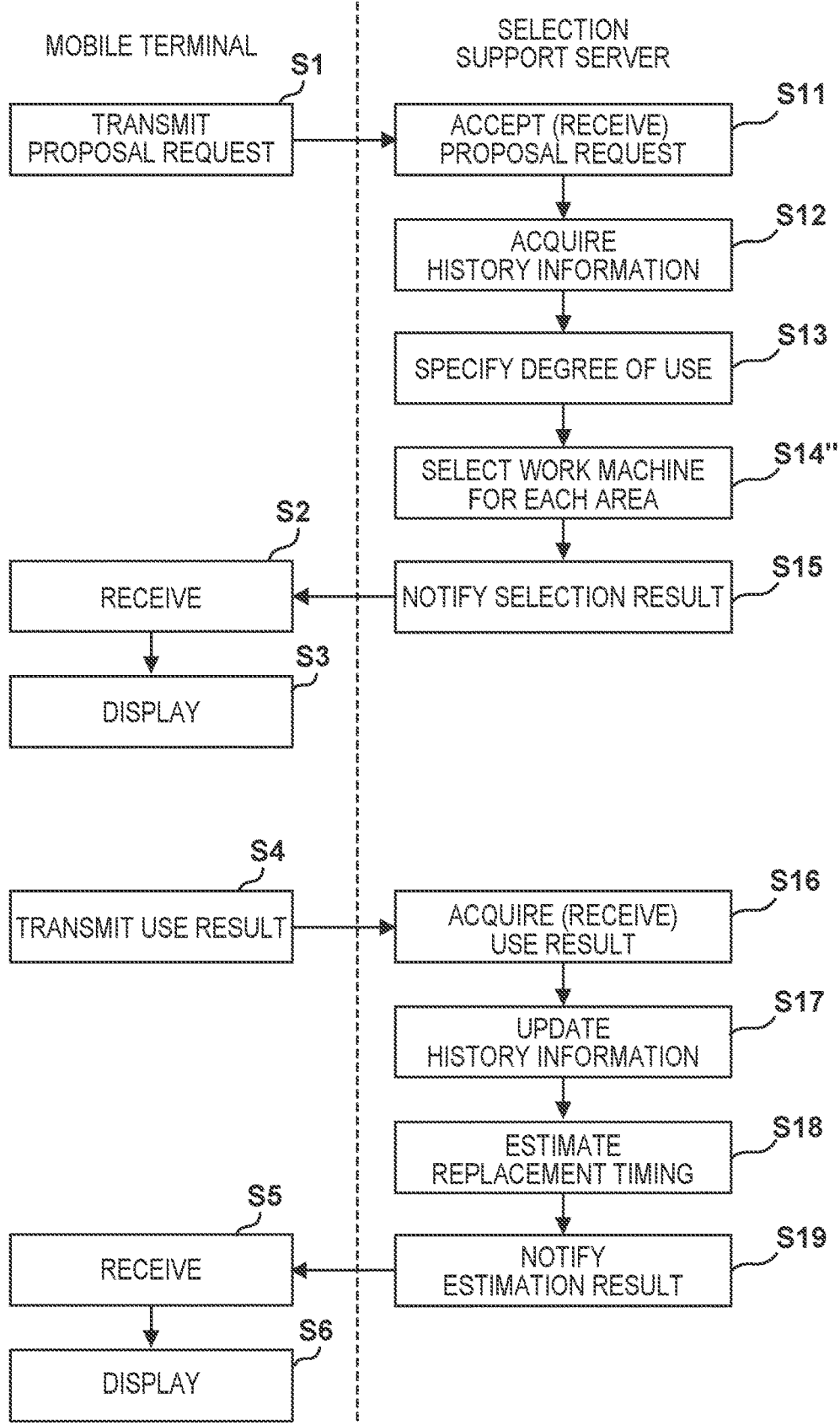
FIG. 11 is a flowchart illustrating another processing example of the system.

In the fourth embodiment, the work scale, in particular, the work area is exemplified as the work information, but the work information is not limited to this. For example, the work information may be information for each work area of the work field WA. FIGS. 10A and 10B are explanatory diagrams, and FIG. 11 is a flowchart illustrating a processing example of the system 1 in the present embodiment instead of the example of FIG. 4, and processing different from that in FIG. 4 will be described.

As illustrated in FIG. 10A, in the present embodiment, it is assumed that work is performed by partitioning the work field WA into a plurality of areas. In the example of FIG. 10A, the work field WA is partitioned into two work areas R1 and R2.

As illustrated in FIG. 10B, when making the proposal request in S1, the supervisor 110 designates the type and the number of necessary work machines for each work area, and designates work information. Work information is individually set in each of the work areas R1 and R2. The work information here is a working time. When accepting the proposal request in S11, the selection support server 2 acquires work information (working time) together with the type and the number of necessary work machines.

When selecting the recommended work machine in S14'', the selection support server 2 selects the recommended work machine for each work area with reference to the work information and the degree of use. In this case, a work machine with a small degree of use is preferentially selected as a work machine to be used for work in the work area R1 having a long working time. Accordingly, the degree of use of the work machine can be leveled.

For example, in FIG. 10B, as selection results, the riding lawn mowers with IDs of A02 and A03 are selected in the work area R1, and the riding lawn mower with the ID of A01 is selected in the work area R2. According to the degree of use in the example of FIG. 3A, the riding lawn mower of A01 with the largest degree of use is allocated to the work area R2 having a short working time, and the riding lawn mowers of A02 and A03 with the small degrees of use are allocated to the work area R1 having a long working time. By such selection, the degree of use of the work machine can be leveled.

In the configuration in which the mode can be selected as in the third embodiment, when the "use-out mode" is selected, a work machine with a large degree of use is preferentially selected as a work machine to be used for work in the work area R1 having a long working time.

In the present embodiment, the mobile terminal 3 is notified of information on the recommended work machine for each work area illustrated in FIG. 10B as a selection result of S15. If the supervisor 110 selects the work machine to be used for work according to the selection result of the selection support server 2, the use of the same type of work machines can be leveled.

Sixth Embodiment

In the first embodiment, an embodiment in which the mobile terminal 3 collects information on the working time of the work machine used for work from the measuring instrument 4 and transmits the collected information to the selection support server 2 (S4, S16) has been described. However, in a case where the measuring instrument 4 has the wide area wireless communication function, the mobile terminal 3 may not be interposed, and information (use result) on the ID of the work machine and the working time may be directly transmitted from the measuring instrument 4 to the selection support server 2 when the work of the work machine is completed, and collected in the selection support server 2.

In addition, in a case where the work machine having the wide area wireless communication function and the work machine not having the wide area wireless communication function are mixed, the work result of the work machine not having the wide area wireless communication function may be temporarily transmitted to the work machine having the wide area wireless communication function by the near field wireless communication function, and may be transmitted from the work machine to the selection support server 2.

Seventh Embodiment

In the first to sixth embodiments, a server-client system including the selection support server 2 and the mobile terminal 3 has been exemplified as the system 1. However, processing similar to that of the system 1 can be realized by the mobile terminal 3, and the mobile terminal 3 can be used as the selection support device.

Figure 12C:
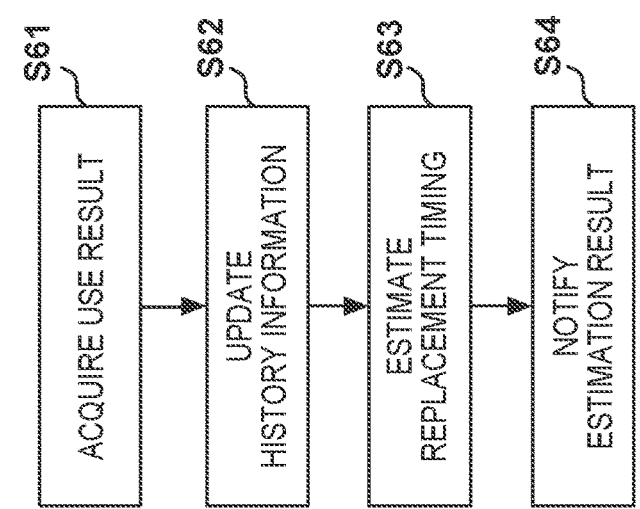
FIGS. 12B and 12C are flowcharts illustrating a processing example.
Figure 12B:
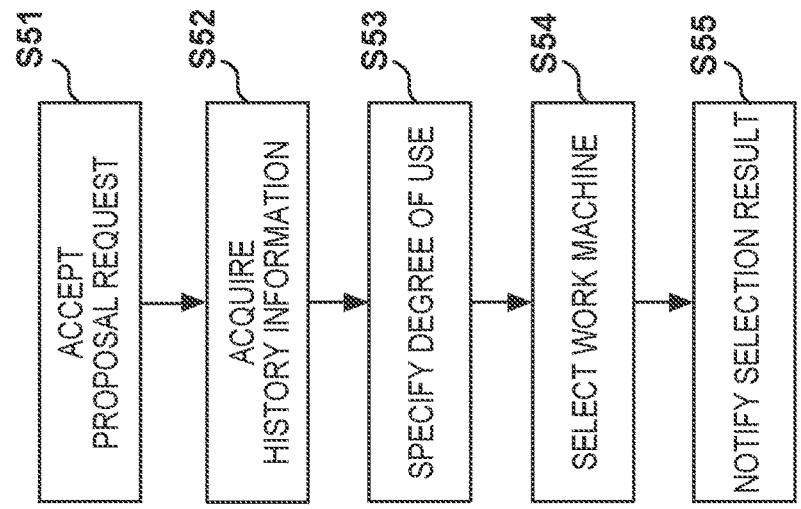
Figure 12A:
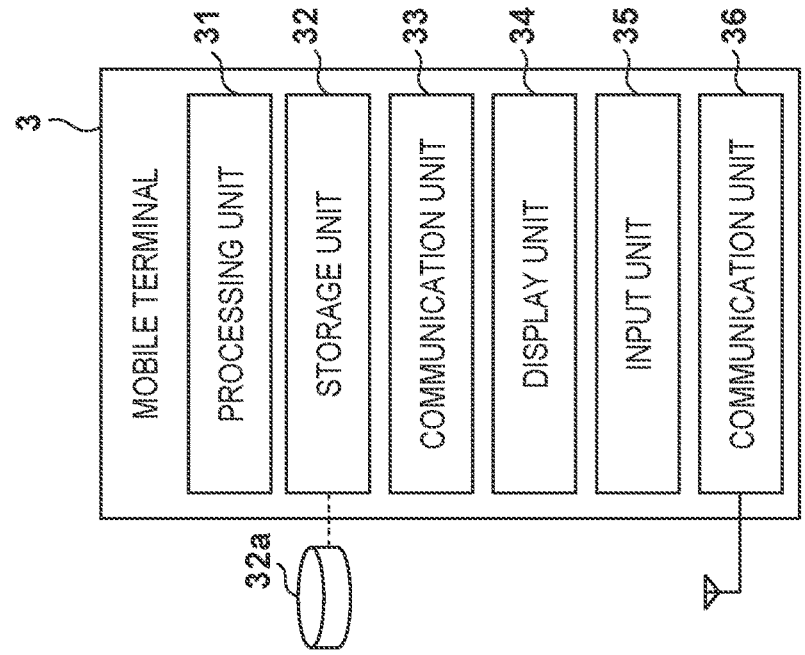
FIG. 12A is a block diagram when a mobile terminal is used as a selection support device.

FIG. 12A is a block diagram of the mobile terminal 3 according to the present embodiment. The difference from the example of FIG. 2 is that the mobile terminal 3 includes a database 32a corresponding to the above database 22a.

FIGS. 12B and 12C are flowcharts illustrating an example of processing executed by the processing unit 31 of the mobile terminal 3 according to the present embodiment. The processing of FIG. 12B relates to the selection processing of the recommended work machine, and is substantially the same as the processing of S11 to S15 of the selection support server 2 illustrated in FIG. 4.

Briefly, in S51, a proposal request from the supervisor 110 is accepted. The supervisor 110 inputs information on the type and number of work machines necessary for work from the input unit 35 and makes a proposal request. Accordingly, the mobile terminal 3 acquires information on the type and number of work machines necessary for work. In S52, the mobile terminal 3 acquires the history information from the database 32a. In S53, the mobile terminal 3 refers to the history information to specify the degree of use of each work machine of the type related to the current proposal request. In S54, the mobile terminal 3 compares the degree of use of each work machine specified in S53 for each type of work machine, and selects a recommended work machine for each type of work machine. In S5, the mobile terminal 3 displays the selection result of S54 on the display unit 34. The supervisor 110 can obtain a selection reference of the work machine to be used for work by this display. If the supervisor 110 selects the work machine to be used for work according to the selection result, the use of the same type of work machines can be leveled. Therefore, the mobile terminal 3 can support leveling of use of work machines.

The processing of FIG. 12C relates to the processing after the completion of the work, and is substantially the same as the processing of S16 to S19 of the selection support server 2 illustrated in FIG. 4.

Briefly, when the work in the work field WA is completed, the work machine used for the work returns to the base 100. The supervisor 110 collects information on the working time of the work machine used for the work. Specifically, in S61, the mobile terminal 3 acquires the ID of the work machine and the information on the working time measured by the measuring instrument 4 into the mobile terminal 3 by wireless communication with the measuring instrument 4 of each work machine used for work.

In S62, the mobile terminal 3 updates the history information in the database 32a based on the acquired use result. The "frequency" of all the work machines is also updated. In S63, the mobile terminal 3 estimates the maintenance timing and the replacement timing for each work machine and each type of work machine based on the updated history information and the work machine information (FIG. 3B). In S64, the mobile terminal 3 displays the estimation result on the display unit 34. With this display, the supervisor 110 can obtain a reference serving as a guide for the maintenance timing or replacement timing of the work machine, and can utilize the reference for the future operation of the work machine.

The present embodiment can be combined with at least one of the second to fifth embodiments. In the present embodiment, the mobile terminal 3 includes the database 32a, but instead, various types of information such as history information may be acquired by communication as necessary from the database 22a of the server corresponding to the selection support server 2.

Other Embodiments

In each of the above embodiments, the lawn mowing work is exemplified as the work contents in the work field WA, but the work contents and the type of the corresponding work machine are not limited to this, and the present invention can be applied to various works such as road work and site work, for example, various works such as snow removal work, agricultural work, pavement work, and park and road cleaning work. In each of the above embodiments, the working time of each work machine is measured by the measuring instrument 4, but a supervisor or a worker may measure the working time and input the working time to the mobile terminal 3.

Summary of Embodiments

The above embodiments disclose at least the following selection support device, selection support method, storage medium, and program.

1. The selection support device of the embodiment is a selection support device (2,3) that supports selection of a work machine to be used for work from among a plurality of work machines, the selection support device comprising:
- a history information acquisition unit (S13,S53) configured to acquire history information on a use history of each work machine;
- a specifying unit (S13,S53) configured to specify a degree of use of each work machine based on the history information; and
- a selection unit (S14,S54) configured to preferentially select a work machine with a small degree of use as a work machine to be used for work.

According to this embodiment, it is possible to provide a technique for supporting leveling of use of work machines.

2. In the embodiment the degree of use is a cumulative working time of the work machine.

According to this embodiment, it is possible to support leveling of the cumulative working time and to support uniform maintenance and replacement of a plurality of work machines.

3. In the embodiment, the degree of use is an index that increases as a cumulative working time of the work machine increases.

According to this embodiment, it is possible to support uniform maintenance and replacement of a plurality of work machines.

4. The selection support device of the embodiment, comprises a work information acquisition unit (S11,S51) configured to acquire work information of a plurality of work areas, wherein
- the selection unit selects a work machine to be used for work in each work area based on the work information and the degree of use.

According to this embodiment, it is possible to support leveling of use of work machines by selecting a work machine for each work area.

5. In the embodiment, the work information includes information on a working time, and
- the selection unit preferentially selects a work machine with a small degree of use as a work machine to be used for work in a work area having a long working time.

According to this embodiment, it is possible to support leveling of use of work machines by selecting a work machine for each work area.

6. The selection support device of the embodiment, comprises a work information acquisition unit (S11,S51) configured to acquire work information on a work field; and
- an estimation unit (S41) configured to estimate a working time when a work in the work field is performed by the work machine selected by the selection unit.

According to this embodiment, it is possible to provide the user with information serving as a guide for the working time.

7. In the embodiment, the selection unit selects a plurality of patterns of work machines to be used for work, and
- the estimation unit estimates the working time for each pattern of the plurality of patterns.

According to this embodiment, it is possible to provide the user with information serving as a guide for the working time for each pattern.

8. In the embodiment, the selection unit:
- preferentially selects a work machine with a small degree of use as a work machine to be used for work when a user selects a first selection mode; and
- preferentially selects a work machine with a large degree of use as a work machine to be used for work when a user selects a second selection mode.

According to this embodiment, the user can select a method for selecting a work machine suitable for leveling the use of a plurality of work machines and a method for selecting a work machine suitable for first using out a work machine with a large degree of use.

9. The selection support device of the embodiment, comprises an estimation unit (S18,S63) configured to estimate a replacement timing of each work machine based on the history information.

According to this embodiment, it is possible to provide the user with information serving as a guide for the replacement timing.

10. In the embodiment, the plurality of work machines are the same type of work machine.

According to this embodiment, it is possible to support leveling of use of the same type of work machine.

11. The selection support method of the embodiment is a selection support method that supports selection of a work machine to be used for work from among a plurality of work machines, the selection support method comprising:
- acquiring (S12,S52) history information on a use history of each work machine;
- specifying (S13,S53) a degree of use of each work machine based on the history information; and
- preferentially selecting (S14,S54) a work machine with a small degree of use as a work machine to be used for work.

According to this embodiment, it is possible to provide a technique for supporting leveling of use of work machines.

12. The storage medium of the embodiment is a storage medium that stores a program for causing a computer to execute a selection support method that supports selection of a work machine to be used for work from among a plurality of work machines, the selection support method comprising:
- acquiring (S12,S52) history information on a use history of each work machine;
- specifying (S13,S53) a degree of use of each work machine based on the history information; and
- preferentially selecting (S14,S54) a work machine with a small degree of use as a work machine to be used for work.

According to this embodiment, it is possible to provide a technique for supporting leveling of use of work machines.

13. The program of the embodiment is a program for causing a computer to execute a selection support method that supports selection of a work machine to be used for work from among a plurality of work machines, the selection support method comprising:
- acquiring (S12,S52) history information on a use history of each work machine;
- specifying (S13,S53) a degree of use of each work machine based on the history information; and
- preferentially selecting (S14,S54) a work machine with a small degree of use as a work machine to be used for work.

According to this embodiment, it is possible to provide a technique for supporting leveling of use of work machines.

The invention is not limited to the foregoing embodiments, and various variations/changes are possible within the spirit of the invention.

What is claimed is:

1. A system for a lawn mowing work on a work field, comprising:

a plurality of lawn mowers, each lawn mower including a sensor configured to measure a working time of lawn mower, and a selection support device that supports selection of a lawn mower to be used for the lawn mowing work from among the plurality of lawn mowers, wherein the selection support device comprises:

a receiving unit configured to receive a proposal request related to selection of a lawn mower to be used for the lawn mowing work through a user's terminal;

a history information acquisition unit configured to acquire history information which indicates past uses of each lawn mower based on a measurement result of the sensor from a database;

a specifying unit configured to specify a cumulative working time of past uses of each lawn mower based on the history information;

a selection unit configured to automatically and preferentially select a lawn mower with a small cumulative working time of past uses as a lawn mower to be used for the lawn mowing work through comparison of specified cumulative working times; and a sending unit configured to send information regarding a lawn mower selected by the selection unit to the user's terminal.

2. The system according to claim 1, wherein the selection support device comprises:

a work information acquisition unit configured to acquire work information of a plurality of work areas on the work field, and wherein the selection unit selects a lawn mower to be used for the lawn mowing work in each work area based on the work information.

3. The system according to claim 2, wherein the work information includes information on a working time, and the selection unit preferentially selects a lawn mower with a small cumulative working time of past uses as a lawn mower to be used for the lawn mowing work in a work area having a long working time.

4. The system according to claim 1, wherein the selection support device comprises:

a work information acquisition unit configured to acquire work information on the work field; and an estimation unit configured to estimate a working time when the lawn mowing work in the work field is performed by the lawn mower selected by the selection unit.

5. The system according to claim 4, wherein the selection unit selects a plurality of patterns of lawn mowers to be used for the lawn mowing work, and the estimation unit estimates the working time for each pattern of the plurality of patterns.

6. The system according to claim 1, wherein the selection unit:

preferentially selects a work machine with a small cumulative working time of past uses as a lawn mower to be used for the lawn mowing work when a user selects a first selection mode; and preferentially selects a work machine with a large cumulative working time of past uses as a lawn mower to be used for the lawn mowing work when a user selects a second selection mode.

7. The system according to claim 1, wherein the selection support device comprises:

an estimation unit configured to estimate a replacement timing of each lawn mower based on the history information.

8. The system according to claim 1, wherein the plurality of lawn mowers are the same type of lawn mower.

9. A selection support method, in a system including a plurality of lawn mowers for a lawn mowing work on a work filed, that is executed on a server so as to support selection of a lawn mower to be used for the lawn mowing work from among the plurality of lawn mowers, the selection support method comprising:

receiving a proposal request related to selection of a lawn mower to be used for the lawn mowing work through a user's terminal;

acquiring history information which indicates past uses of each lawn mower based on a measurement result of a sensor provided with each lawn mower from a database;

specifying a cumulative working time of past uses of each lawn mower based on the history information;

automatically and preferentially selecting a lawn mower with a small cumulative working time of past uses as a lawn mower to be used for the lawn mowing work through comparison of specified cumulative working times; and sending information regarding a lawn mower selected by the selecting to the user's terminal.

10. A storage medium that stores a program for causing a computer to execute a selection support method, in a system including a plurality of lawn mowers for a lawn mowing work on a work filed, that supports selection of a lawn mower to be used for the lawn mowing work from among the plurality of lawn mowers, the selection support method comprising:

receiving a proposal request related to selection of a lawn mower to be used for the lawn mowing work through a user's terminal;

acquiring history information which indicates past uses of each lawn mower based on a measurement result of a sensor provided with each lawn mower from a database;

specifying a cumulative working time of past uses of each lawn mower based on the history information; and automatically and preferentially selecting a lawn mower with a small cumulative working time of past uses as a lawn mower to be used for the lawn mowing work through comparison of specified cumulative working times; and sending information regarding a lawn mower selected by the selecting to the user's terminal.

* * * * *